United States Patent [19]

Beckman et al.

[11] Patent Number: 5,085,368
[45] Date of Patent: Feb. 4, 1992

[54] SYSTEM FOR CONTROLLING POULTRY HOUSE WINDOW CLOSURES

[76] Inventors: John B. Beckman, 136 Adamson Dr., Cedartown, Ga. 30125; Martin Blickstein, 3745 Wildwood Ct., Alpharetta, Ga. 30201

[21] Appl. No.: 600,719

[22] Filed: Oct. 22, 1990

[51] Int. Cl.⁵ .............................................. F24F 13/08
[52] U.S. Cl. .................................................. 236/49.3
[58] Field of Search ...................................... 236/49.3

[56] References Cited

U.S. PATENT DOCUMENTS

| | | | |
|---|---|---|---|
| 2,456,489 | 12/1948 | Burkholder, Jr. | 49/97 |
| 3,042,001 | 7/1962 | Dubie et al. | 160/5 |
| 3,429,298 | 2/1969 | Thomason | 119/21 |
| 3,474,761 | 10/1969 | Thomason | 160/170 |
| 3,511,299 | 5/1970 | Newell et al. | 160/1 |
| 3,571,973 | 3/1971 | Roberts | 49/2 |
| 3,665,996 | 5/1972 | Roberts | 160/1 |
| 3,669,350 | 6/1972 | Whide | 236/49 |
| 3,706,271 | 12/1972 | Mieczkowski | 98/41 |
| 3,741,101 | 6/1973 | Sheppard | 98/86 |
| 3,777,241 | 12/1973 | Wenger et al. | 318/480 |
| 3,802,479 | 4/1974 | Newell et al. | 160/1 |
| 3,915,377 | 10/1975 | Sutton, Jr. | 236/49 |
| 3,955,792 | 5/1976 | Cho | 251/69 |
| 3,973,173 | 8/1976 | Smith | 317/147 TD |
| 4,113,175 | 9/1978 | Sutton, Jr. | 236/46 A |
| 4,130,156 | 12/1978 | Wardlaw | 160/9 |
| 4,195,384 | 4/1980 | McCabe | 16/48.5 |
| 4,322,152 | 3/1982 | Satoh et al. | 354/204 |
| 4,486,007 | 12/1984 | Kuhlman | 254/376 |

Primary Examiner—William E. Tapolcai
Attorney, Agent, or Firm—Kennedy & Kennedy

[57] ABSTRACT

A system is described for use in controlling the position of window closures in poultry houses without the use of significant electric power in response to sensed air conditions within the house. The system includes pulleys releasibly loaded on a cable connected to a curtain which have respective weights that may lift and lower the curtain when the pulleys are released.

19 Claims, 2 Drawing Sheets

SYSTEM FOR CONTROLLING POULTRY HOUSE WINDOW CLOSURES

TECHNICAL FIELD

This invention relates to systems for controlling the position of window closures in poultry houses.

BACKGROUND OF THE INVENTION

To achieve adequate profit margins, commercial poultry houses are designed to house large numbers of chickens in compact, densely populated conditions. For example, it is common to house 25,000 chickens in poultry houses measuring 400 by 40 feet. Under these conditions it is essential that the houses be well ventilated and that their air quality and temperature be maintained within proper ranges. To this end poultry houses are constructed with large open windows and equipped with window closures and fans.

As it is not cost efficient for chicken ranchers to monitor poultry house conditions personally on a continuous basis, and to adjust the window closures manually, systems have been devised for automating such activities. For example, in U.S. Pat. No. 3,511,299 one such system is shown which has a motor coupled with cables that control the position of the window closures automatically in response to control signal generated by a thermostat or humidistat. This type of a system however is expensive and requires continuous preventive and corrective maintenance at substantial costs. Also, as this type system uses electric motors, system failure can occur in the event of a power failure or motor failure. Unless this is recognized fairly quickly, system failure can easily lead to a disastrous loss of poultry.

As a result systems have more recently been developed which actuate window closures mechanically without the use of electric motors in the event of power failure. Exemplary of this type of system is that shown in U.S. Pat. No. 3,915,377. This system automatically releases drop curtain type window closures in response to the detection of power failure. Though such does immediately improve cross ventilation, while the house ventilating fans are idled by the power failure, the house air may rapidly become dangerously cold during cold weather conditions. Therefore, here again the rancher himself must still monitor house conditions fairly frequently to avoid injurious conditions from arising even with the use of this type of safety system.

It thus is seen that a need still remains for a system for controlling poultry house window closures on an automated basis that can be operated on a limited basis even during power failure conditions. Accordingly, it is to the provision of such a system that the present invention is primarily directed.

SUMMARY OF THE INVENTION

In a preferred embodiment of the invention, a system for controlling the position of closures used to control the flow of air through ventilation openings of a poultry house comprises a space condition sensing means for sensing condition of the air within the poultry house such as temperature, humidity or air quality. The system has a cable adapted to be coupled with the closure upon which is loaded a first cable positioning means of weight sufficient to move the closure from a position with less of the closure weight supported by the cable towards another position with more of the closure weight supported by the cable. The first cable positioning means is releasibly supported by a support means. A first control means is coupled with the space condition sensing means and the support means for releasing the releasable support means in response to the condition sensing means sensing a selected level of the condition of the air within the poultry house. This permits the first cable positioning means to lower and move the cable and in so doing move the closure from the one position towards the other position.

The system further comprises a second cable positioning means of weight insufficient to support the closure at the one position or to effect movement of the closure from the one position towards the other position when loaded upon the cable, and hold-down means for releasibly holding down the second cable positioning means. A second control means is coupled with the condition sensing means and the hold-down means for releasing the releasable hold-down means and thereby permit the second cable positioning means to raise the cable to move the closure from the other position towards the one position. Thus, upon coupling the cable to the closure and routing the cable under the first and second positioning means, under tension, the closure may be moved at least one full cycle between greater and lesser air flow restricted positions in response to reversed changes in sensed conditions of air in the poultry house. It should be noted that the term full cycle is meant to mean a reversal in the direction of closure movement from that of the initial movement.

Where the closure is a drop curtain it is loaded onto the cable in a partially or fully ventilation opening open position. Conversely, where the closure is a lift curtain it is loaded onto the cable in a partially or fully ventilation opening closed position.

DETAILED DESCRIPTION

Figure 1:
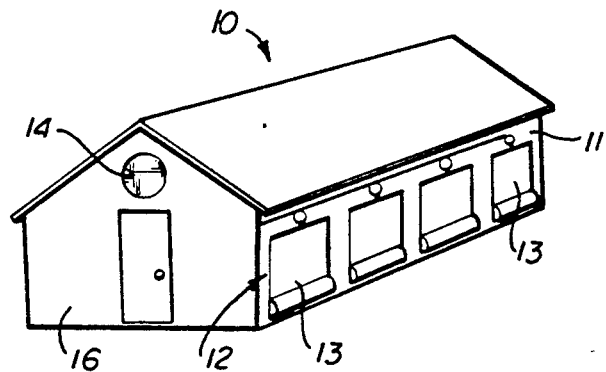
FIG. 1 is a perspective view of a conventional poultry house in which a system embodying principles of the present invention may be used.
Figure 2:
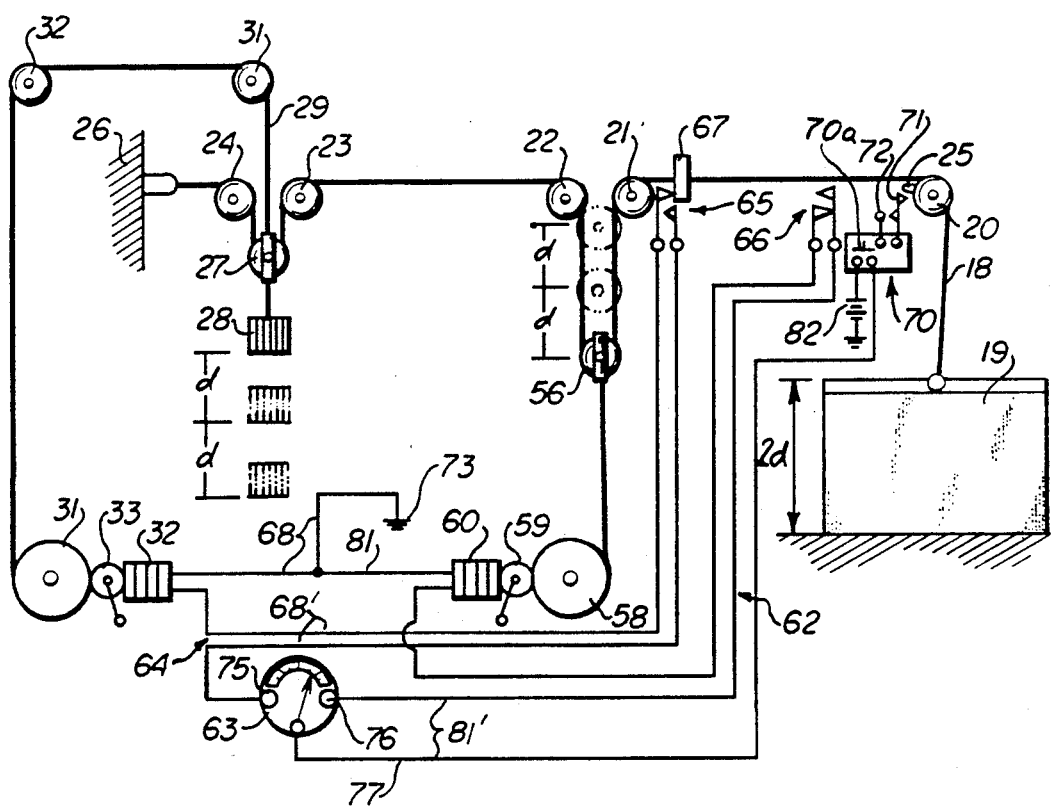
FIG. 2 is a schematic diagram of a system embodying principles of the invention in a preferred form designed for use with poultry house lift curtain type window closures.
Figure 4:
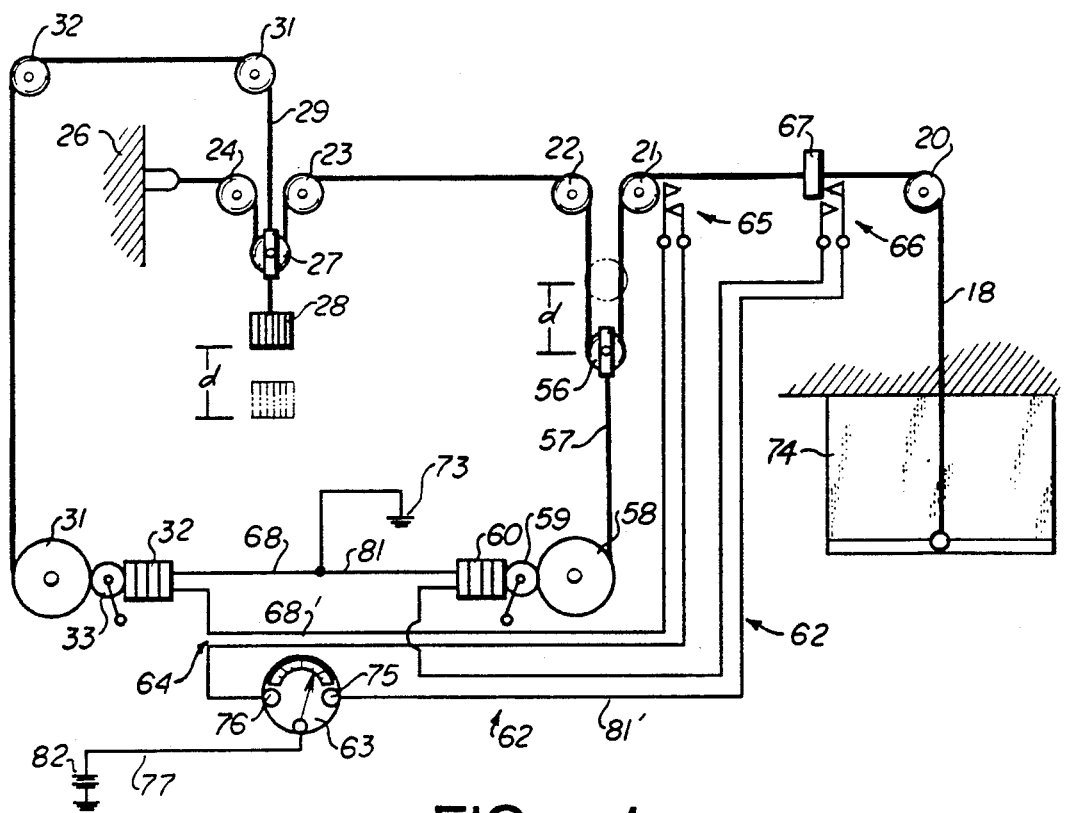
FIG. 4 is a schematic diagram of a system embodying principles of the invention in another preferred form designed for use with poultry house drop curtain type window closures.

With reference next to the drawings, there is shown in FIG. 1 a conventional poultry house 10 having side walls 11 with ventilating openings or windows 12. The openings 12 are provided with closure means 13 for controlling the flow of air through the poultry house 10. An electrically powered ventilating fan 14 is provided in an end wall 16 of the poultry house 10 for drawing ambient air into the house. An unshown exhaust fan is in the opposite wall. Typically a number of internal fans are also included. The closure means 13 may be adjusted in a variety of air flow restrictive positions to vary the flow of air through the openings. The specific closure means shown FIG. 2 is a lift curtain 19 adapted to be dropped to open a ventilating opening to ambient air and lifted to close the opening. Conversely, the specific closure means shown in FIG. 4 is a drop curtain adapted to be lifted to open the ventilating opening. The new system may also be used with other types of conventional closure means such as louvers and shutters.

In FIG. 2 a system is shown for controlling the position of a lift curtain 19 which includes a cable 18 mounted to the top of the curtain. Cable 18 is drawn tautly over idler pulleys 20, 21, 22, 23 and 24. The other end of cable 18 is anchored to a wall 26. Note here that the pulley 20 has a raised bearing portion 25.

A first cable positioning pulley 27 is loaded onto cable 18 between and below pulleys 23 and 24. A weight 28 is mounted to the first cable positioning pulley 27. Alternatively, the pulley itself may possess the additional weight provided by the independent weight 28. An auxiliary cable 29 extends from the bearing frame of the cable positioning pulley 27, over idler pulleys 31 and 32, to a winch 31. A cranking device 33 is coupled with the winch 31 which is controlled by control means 32.

A second cable positioning pulley 56 is also loaded onto cable 18 between and below idler pulleys 21 and 22. An auxiliary cable similarly extends from the bearing frame of the second cable positioning pulley 56 to another winch 58 to which a cranking device 59 is coupled. The cranking device 59 is controlled by a control means 60.

The control means 32 is operably coupled with a poultry house thermostat 63 by an electric circuit 64. The electric circuit 64 includes a conductor 68 that extends between the control means 32 and ground 73 and a conductor 68' that extends between the control means and a thermostat low temperature contact 75 through a switch 65. A conductor 77 is connected between the thermostat ground terminal and a switch assembly 70 mounted adjacent the idler pulley 20 and to battery 82 and to a ground. Similarly, control means 60 is operable coupled to the thermostat 63 by another electric circuit 62. The electric circuit 62 includes a conductor 81 that extends between the control means 60 and conductor 68, and another conductor 81' that extends between the control means 60 and a thermostat high temperature contact 76 through a switch 66. The switch assembly 70 has a movable contact 71, a stationary contact 72 and a multivibrator switch. The multivibrator switch 70A opens in response to closings of contacts 71 and 72, and remains open for a preset period of time. This serves to prevent the thermostat 63 from initiating any motion for that period of time, thereby allowing conditions in the poultry house to stabilize before making further adjustments.

Figure 3A:
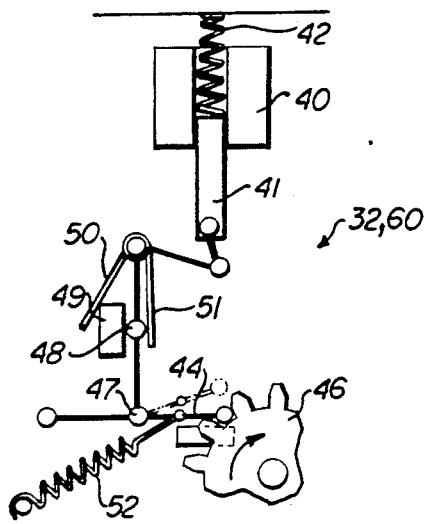
FIG. 3a and 3b are more detailed illustrations of a control means of the system shown in FIG. 2.
Figure 3B:
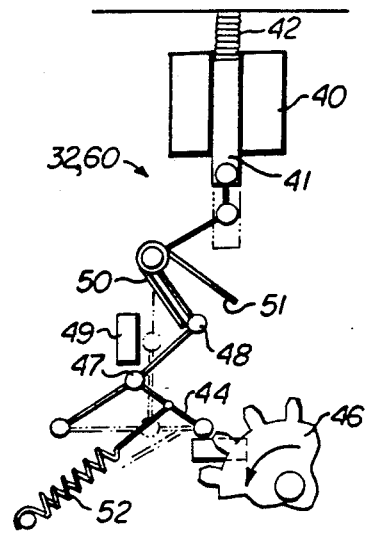

The control means 32 is shown in FIGS. 3a and 3b to comprise a time delayed solenoid 40 having a plunger 41 biased by a spring 42. Plunger 41 is operably coupled with linkage which is linked to a pawl 44 that may be placed in and out of the teeth of gear 46 of the winch 31. This linkage comprises a knuckle joint 47 coupled with pawl 44 and another knuckle joint 48 positioned to engage and disengage a stop 49. The linkage further comprises a pivotable disengagement lever 50, a pivotable engagement lever 51, and a pawl biasing spring 52.

For use thermostat 63 is set so that upon sensing a selected low temperature of air within the poultry house it closes electric circuit 64. If the curtain 19 is in a fully raised position switch 65 is open by the switch trip 67 secured to cable 18 and no curtain movement occurs. However, if switch 65 is closed, and the circuit is complete, the control means 32 releases winch 31. The release of winch 31 plays out auxiliary cable 29 which enables cable positioning pulley 27 to lower upon cable 18 a distance d represented by the movement of weight 28 shown in phantom lines which in turn raises curtain 19 a corresponding distance 2d.

As curtain 19 is lowered or raised the raised bearing portion 25 of idler pulley 20 moves the cam switch assembly moveable contact 71 momentarily into contact with the stationary contact 72 thus closing a switch which activates an unshown single shot multivibrator which temporarily disables thermostat 63. This is done to allow enough time for the condition of the air to change before air condition monitoring is resumed.

Should thermostat 63 later sense a high temperature condition electric circuit 62 is closed which actuates control means 60 which also comprises the mechanism shown in FIGS. 3a and 3b. If curtain 19 is in a fully lowered position, and switch trip 67 has opened switch 66, no curtain movement occurs. If however switch 66 is closed circuit 62 is complete and control means 59 releases winch 58, as previously described. The release of winch 58 enables taut cable 18 to lift the cable positioning pulley 56 a distance d represented by the cable positioning pulley 56 shown in phantom lines. This in turn enables the curtain 19 to drop a corresponding distance 2d. In this manner a full cycle of curtain movement in one direction followed by curtain movement in the opposite direction may occur without electric power other than that minor amount provided by the control circuitry battery 82. Thus here the term "full cycle" is means that the window closure is moved in two opposite directions. To reset the system for additional cycles of operations, weight 28 and pulley 56 are winched back to their original positions by manual operation of winches 31 and 58.

With reference to FIGS. 3a and 3b it is seen that the control means 32 releases winch 31 by disengaging pawl 44 from winch gear 46 which normally is held in engagement with the gear by spring 52. This is accomplished by energizing solenoid 40 which retracts plunger 41 from its extended position shown in FIG. 3a to its position shown in FIG. 3b. The movement of plunger 41 rotates levers 50 and 51 resulting in the disengagement lever 50 moving knuckle joint 48 out of abutment against stop 49 which raises knuckle joint 47. The movement of knuckle joint 47 moves pawl 44 from engagement from winch gear 46 which is assisted by the force of spring 52. The pawl 44 is reengaged with winch gear 46 by deenergizing the solenoid by the electric circuit 64 thus enabling the compressed spring 42 to extend plunger 41 to its initial position which rotates lever 51 moving knuckle joint 48 in abutment against stop 49 thereby returning the elements of the linkage to their initial position.

The movement of the cable positioning pulleys 27 and 56 are limited with the first cable positioning pulley 27 being limited in movement to the length of auxiliary cable 29 and to the unrestricted downward movement of the pulley 27 and its weight. The second cable positioning pulley 56 is limited in movement to it obtaining a position adjacent idler pulleys 21 and 22 with cable 18 drawn tautly between them and the length of auxiliary cable 57.

Operation of a solenoid 40 causes a winch to start unwinding. The solenoid releases instantaneously but takes a discreet period of time, some fraction of a second for instance, to recover and reengage the pawl, stopping the curtain movement and stopping the winch rotation. The solenoid recovery period thus determines the length of the cable unwound from the winch, and the distance of the curtain movement. The solenoid, and therefore the curtain, will not move again until it is tripped again by the sensing means. In turn, the sensing means cannot activate either of the release mechanisms until the time delay multivibrator recovers, and closes the circuit. Thus, this system permits incremental movements in either direction in response to sense conditions. That is, the curtain does not have to bottom out in any direction in order to reverse direction but can move up during one increment, down during the next three increments, then reverse and so forth until both positioning pulleys are played out.

In FIG. 4 the system is shown for use in operating a lift curtain 74 instead of a drop curtain. It is essentially the same as the system shown in FIG. 2 except that here the control circuit 64 connects control means 32 to the high temperature contact 76 of the thermostat instead of the low temperature contact. Similarly, the control circuit 62 connects control means 60 with the low temperature contact 75. This reversal is done because the lift curtain 74 is raised to open a window and enhance entry of ambient air while the drop curtain is raised for precisely the opposite purpose, i.e. to close the window.

The system can also be adapted to actuate the movement of other types of window closures such as louvers or shutters which are opened or closed by spring biased levers. In those cases cable 18 is mounted as a counter bias to the force of a spring as opposed to simple weight bias as in the case of curtains.

From the foregoing, it is seen that a system for controlling the position of window closures in a poultry house is now provided which overcomes problems long associated with those of the prior art. It should however be understood that the just described embodiments merely illustrate principles of the invention in two preferred forms. Many modifications, additions and deletions may, of course, be made thereto without departure from the spirit and scope of the invention as set forth in the following claims.

We claim:

1. In a poultry house having ventilating openings and closure means for controlling the flow of air through the ventilating openings by positioning the closure means at greater and lesser air flow restrictive positions, a system for controlling the position of the closure means which comprises:

a space condition sensing means for sensing levels of a condition of the air within the poultry house such as temperature, humidity or air quality;

cable adapted to be coupled with the closure means;

first cable positioning means of weight sufficient to move the closure means from a position with less of the closure weight supported by the cable towards another position with more of the closure weight supported by the cable;

support means for releasibly supporting said first cable positioning means;

first control means coupled with said space condition sensing means and said support means for releasing said releasable support means in response to said condition sensing means sensing a selected level of the condition of the air within the poultry house and thereby permit said first cable positioning means to lower and move said cable and thereby move the closure means from said one position towards said other position;

second cable positioning means of weight insufficient to support the closure at the one position or to effect movement of the closure means from said one position to said other position when loaded upon said cable;

hold-down means for releasibly holding down said second cable positioning means, and second control means coupled with said condition sensing means and said hold-down means for releasing said releasable hold-down means-and thereby permit said second cable positioning means to raise said cable to move the closure means towards said one position, whereby upon coupling the cable to the closure means and routing the cable under the first and second cable positioning means under tension the closure means may be moved at least one full cycle between greater and, lesser air flow restricted positions in response to reversed changes in sensed conditions of the air in the poultry house.

2. The system of claim wherein said first cable positioning means comprises a pulley system that includes a pulley releasibly supported by said support means.

3. The system of claim 2 wherein said support means comprises a winch about which an auxiliary cable is wound and is coupled to said first cable positioning means pulley.

4. The system of claim 3 wherein said winch has a ratchet, and wherein said first control means comprises a pawl mounted for releasable engagement with said winch ratchet and a electric circuit means that includes a solenoid operatively coupled by linkage means with said pawl.

5. The system of claim 4 wherein said first control means further comprises a spring mounted to said pawl biasing said pawl towards a position out of engagement with said winch ratchet; wherein said linkage means comprises a knuckle joint coupled with said pawl and a lever pivotably coupled with said solenoid in a position to engage and move said knuckle joint upon operation of said solenoid, whereby operation of the solenoid moves the pivotable lever into engagement with the knuckle joint which moves the pawl out of engagement with the winch ratchet.

6. The system of claim 5 wherein said control means further comprises a second lever pivotably coupled with said solenoid in a position to engage and move said knuckle joint upon recovery of said solenoid, whereby recovery of the solenoid moves the second pivotable lever into engagement with the knuckle joint which moves the pawl into engagement with the winch ratchet.

7. The system of claim 4 wherein said first control means electric circuit further comprising- switch means mounted adjacent said cable for operation in response to movements of said cable and time delay circuit disabling means.

8. The system of claim 7 wherein said second cable positioning means comprises a pulley system that includes a pulley releasibly held down by said hold-down means.

9. The system of claim 4 wherein said hold-down means comprises a winch about which an auxiliary cable is wound and is coupled to said second cable positioning means pulley.

10. The system of claim 9 wherein said winch has a ratchet, and wherein said second control means comprises a pawl mounted for releasable engagement with said winch ratchet and a electric circuit means that includes a solenoid operatively coupled by linkage means with said pawl.

11. The system of claim 10 wherein said second control means further comprises a spring mounted to said pawl biasing said pawl towards a position out of engagement with said winch ratchet; wherein said linkage means comprises a knuckle joint coupled with said pawl and a lever pivotably coupled with said solenoid in a position to engage and move said knuckle joint upon operation of said solenoid, whereby operation of the solenoid moves the pivotable lever into engagement with the knuckle joint which moves the pawl out of engagement with the winch ratchet.

12. The system of claim 11 wherein said second control means further comprises a second lever pivotably coupled with said solenoid in a position to engage and move said knuckle joint upon recovery of said solenoid, whereby recovery of the solenoid moves the pivotable lever into engagement with the knuckle joint which moves the pawl into engagement with the winch ratchet.

13. The system of claim 10 wherein said first control means electric circuit further comprising switch means mounted adjacent said cable for operation in response to movements of said cable.

14. A system for controlling the ventilation of a poultry house of the type having a drop curtain at least partially covering a ventilation opening, said system comprising space condition sensing means for sensing levels of a condition of the air within the poultry house such as temperature, humidity or air quality, a cable coupled tautly to a lower portion of the drop curtain, a curtain raising pulley of weight sufficient to raise the drop curtain upon being loaded onto said taut cable, first control means coupled with said curtain raising pulley for loading said curtain raising pulley onto said cable in response to said sensing means sensing one selected air condition level, a curtain lowering pulley releasibly held upon said taut cable of weight insufficient to raise or maintain the drop curtain in a raised condition upon being loaded onto said taut cable, and second control means coupled with said curtain lowering pulley for releasing said curtain lowering pulley in response to said sensing means sensing another selected air condition level.

15. The system of claim 14 wherein said first control means includes support means for controllably supporting said curtain raising pulley.

16. The system of claim 14 wherein said second control means includes hold-down means coupled to said curtain lowering pulley for releasibly holding down said curtain lowering pulley upon said taut cable.

17. A system for controlling the ventilation of a poultry house of the type having a lift curtain at least partially covering a ventilation opening, said system comprising space condition sensing means for sensing levels of a condition of the air within the poultry house such as temperature, humidity or air quality, a cable coupled tautly to an upper portion of the lift curtain, a curtain raising pulley of weight sufficient to raise the lift curtain upon being loaded onto said taut cable, first control means coupled with said curtain raising pulley for loading said curtain raising pulley onto said cable in response to said sensing means sensing one selected air condition level, a curtain lowering pulley of weight insufficient to raise or maintain the left curtain in a raised condition upon being loaded onto said taut cable, and second control means coupled with said curtain lowering pulley for releasing said holding said curtain lowering pulley in response to said sensing means sensing another selected air condition level.

18. The system of claim 17 wherein said first control means includes support means for controllably supporting said curtain raising pulley.

19. The system of claim 17 wherein said second control means includes hold-down means coupled to said curtain lowering pulley for releasibly holding down said curtain lowering pulley upon said taut cable.

* * * * *